(12) United States Patent
Nagasawa

(10) Patent No.: US 12,503,168 B2
(45) Date of Patent: Dec. 23, 2025

(54) VEHICLE BODY FRONT STRUCTURE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 391 days.

(21) Appl. No.: 18/317,329

(22) Filed: May 15, 2023

(65) Prior Publication Data
US 2023/0382458 A1 Nov. 30, 2023

(30) Foreign Application Priority Data
May 31, 2022 (JP) .................. 2022-089136

(51) Int. Cl.
*B62D 21/15* (2006.01)
*B60K 1/00* (2006.01)
*B62D 21/11* (2006.01)

(52) U.S. Cl.
CPC .............. *B62D 21/155* (2013.01); *B60K 1/00* (2013.01); *B62D 21/11* (2013.01)

(58) Field of Classification Search
CPC .... B62D 21/155; B62D 21/11; B62D 25/082; B60K 1/00; B60K 5/1208; B60K 5/1275; B60K 5/1283; B60K 2007/0053; B60K 2360/652; B60K 5/1233
See application file for complete search history.

(56) References Cited

U.S. PATENT DOCUMENTS

| 5,884,963 A * | 3/1999 | Esposito | ............. B62D 27/065 |
| | | | 280/784 |
| 11,565,578 B2 * | 1/2023 | Shimizu | ................... B60K 1/04 |
| 2018/0312198 A1 * | 11/2018 | Shimizu | ................... B60K 1/04 |

FOREIGN PATENT DOCUMENTS

| CN | 102343939 A | * | 2/2012 | ............. B62D 21/11 |
| JP | 08085473 A | * | 4/1996 | |
| JP | 2003146242 A | * | 5/2003 | |
| JP | 2003320958 A | * | 11/2003 | |
| JP | 5187105 B2 | * | 4/2013 | |
| JP | 2020-083144 | | 6/2020 | |

* cited by examiner

*Primary Examiner* — Michael T. Walsh
(74) *Attorney, Agent, or Firm* — Smith, Gambrell & Russell, LLP

(57) ABSTRACT

A vehicle body front structure for a vehicle includes front side frames in a pair, sub-frames in a pair disposed under the front side frames, a torque box extending on a bottom surface of the vehicle and coupled to the front side frames, a toeboard coupled to upper portions of the front side frames, first transmission members each configured to couple a corresponding one of the front side frames and a corresponding one of the sub-frames, second transmission members each configured to couple the torque box and a corresponding one of the sub-frames, and operation levers each disposed along a lower surface of a corresponding one of the sub-frames. Each operation lever has a one end on a front side secured to the corresponding one of the sub-frames and has another end on a rear side secured to a corresponding one of the first transmission members.

4 Claims, 6 Drawing Sheets

VEHICLE BODY FRONT STRUCTURE

CROSS-REFERENCE TO RELATED APPLICATIONS

The present application claims priority from Japanese Patent Application No. 2022-089136 filed on May 31, 2022, the entire contents of which are hereby incorporated by reference.

BACKGROUND

The disclosure relates to a vehicle body front structure.

Generally, in a frontal collision of a vehicle, in order to reduce injury to an occupant, it is effective to prevent deformation of a cabin, which is an occupant boarding space. For this purpose, various devices have been provided.

In recent years, as one of these devices, a structure forward of the cabin and configured to absorb collision energy has prevailed.

Meanwhile, when the vehicle is a hybrid vehicle, an electric vehicle or the like, a battery pack as a power source of the vehicle is mounted on a floor surface under the cabin in some cases.

Power to drive the vehicle is stored in the battery pack. When deformation or disconnection of the battery pack occurs due to a frontal collision of the vehicle, for example, there is also a possibility of inducing a drastic abnormal reaction. In this respect, there is room for improvement.

Therefore, in the case of a hybrid vehicle, an electric vehicle or the like, a degree of importance of the structure configured to prevent deformation of the cabin has been increased not to damage the battery pack.

In response to this demand, a technique is disclosed in which when an impact of a frontal collision is applied to a vehicle where a battery is mounted, such as a hybrid vehicle and an electric vehicle, deformation of front side members by the impact is controlled, for example, so that collision energy is absorbed, and that a drive motor disposed in a front part of the vehicle is protected (see, for example, Japanese Unexamined Patent Application Publication (JP-A) No. 2020-083144).

SUMMARY

An aspect of the disclosure provides a vehicle body front structure for a vehicle. The vehicle body front structure includes front side frames in a pair, sub-frames in a pair, a torque box, a toeboard, first transmission members, second transmission members, and operation levers. The front side frames are disposed in a front part of the vehicle and extend in a fore-and-aft direction of the vehicle. Each of the sub-frames is disposed under a corresponding one of the front side frames and located on a bottom surface of a power unit of the vehicle. The power unit is configured to drive front wheels of the vehicle. The sub-frames extend in the fore-and-aft direction of the vehicle. The torque box extends on a bottom surface of the vehicle in a vehicle width direction of the vehicle and is coupled to the front side frames. The toeboard is coupled to upper portions of the front side frames. Each of the first transmission members is configured to couple a corresponding one of the front side frames and a corresponding one of the sub-frames. Each of the second transmission members is configured to couple the torque box and a corresponding one of the sub-frames. Each of the operation levers is disposed along a lower surface of a corresponding one of the sub-frames. Each of the operation levers has one end on a front side secured to the corresponding one of the sub-frames and has another end on a rear side secured to a corresponding one of the first transmission members. Each of the front side frames comprises an inclined portion bent downward toward a rear of the vehicle from a joint with the toeboard. Each of the first transmission member extends from a joint with the corresponding one of the sub-frames and is coupled to the inclined portion of the corresponding one of the front side frames. Each of the second transmission members has one end coupled to a bottom surface of the torque box and has another end coupled to the lower surface of the corresponding one of the sub-frames, the lower surface being higher than the bottom surface of the torque box in a vertical direction of the vehicle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 6A is a side view prior to the collision, and FIG. 6B to FIG. 6D are side views illustrating the deformation during the frontal collision as time elapses.

DETAILED DESCRIPTION

Figure 1:
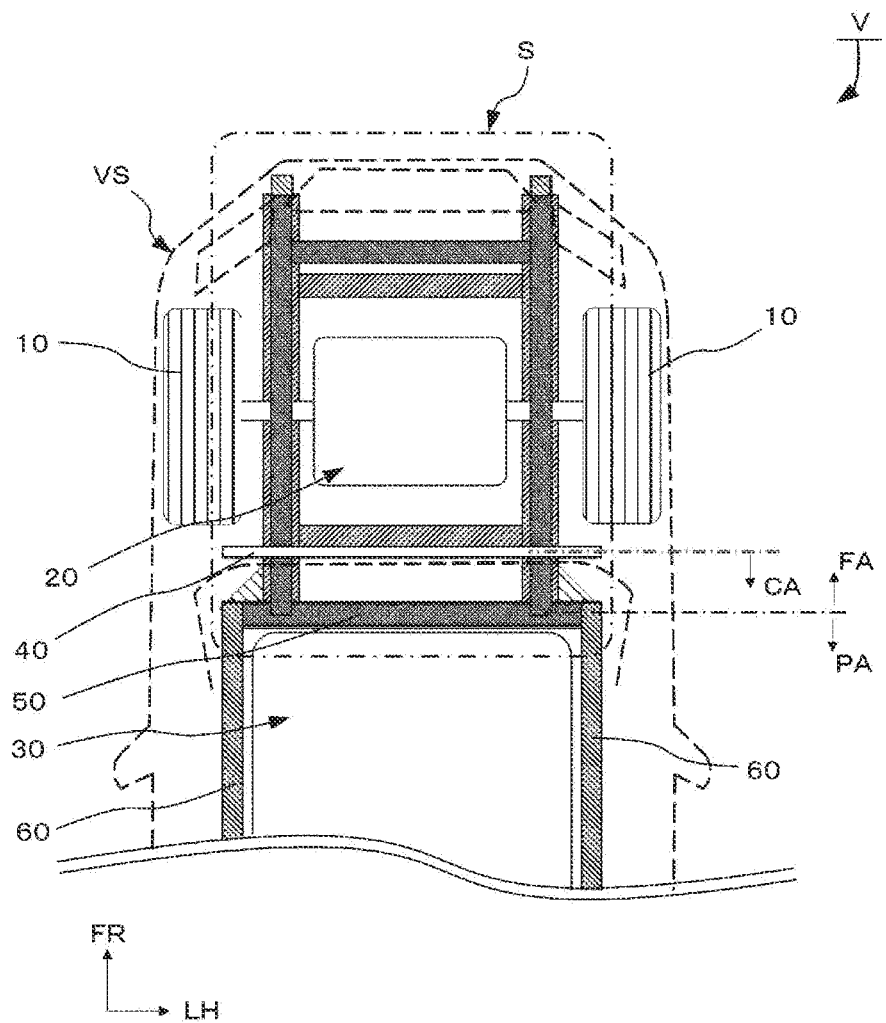
FIG. 1 is a diagram illustrating a configuration of a vehicle according to an embodiment of the disclosure, as viewed from above.

Concerning a frontal collision of a vehicle, multiple collision modes are to be considered, for example, a full wrap frontal collision in which a whole front surface of the vehicle collides with a collision object, an offset collision in which one side of the front surface of the vehicle collides with the collision object, and a small overlap collision having an offset rate of approximately 25%.

Therefore, in each of the collision modes, there has been a demand for a structure forward of a cabin or a battery pack and configured to absorb collision energy so as not to deform the cabin and the battery pack.

In the technique disclosed in JP-A No. 2020-083144, the structure is proposed in which front side members on both sides of the vehicle are bent inward in vehicle width directions due to fragile portions formed in a cross member in such a manner that collision energy generated in the multiple collision modes is absorbed more effectively.

However, in the technique disclosed in JP-A No. 2020-083144, an impact absorption structure configured to protect the cabin or the battery pack disposed rearward of the cross member is not considered, and consequently, when the collision energy is transmitted rearward of the fragile portions of the front side members on both sides of the vehicle, there is a possibility of deforming the cabin or the battery pack. In this respect, there is room for improvement.

It is desirable to provide a vehicle body front structure that can prevent deformation of the cabin and the battery pack even in the multiple frontal collision modes.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A vehicle body front structure S according to the embodiment of the disclosure is applied to a vehicle V. It is noted that as illustrated for convenience in the drawings, arrow FR indicates forward (front) of the vehicle V illustrated in FIG. 1, arrow UP indicates upward of the vehicle V in a front view, and arrow LH indicates leftward of the vehicle V in a front view. In the following description, a vertical direction, a fore-and-aft direction, and a lateral direction are used to respectively indicate a vertical direction in a front view, a fore-and-aft direction in a front view, and a lateral direction in a front view unless specified otherwise.

EMBODIMENT

Referring to FIG. 1 to FIG. 5, a configuration of the vehicle body front structure S according to the embodiment provided for the vehicle V will be described.

Configuration of Vehicle V

The vehicle V is, for example, an electric vehicle including a power unit 20 as a drive source. However, the vehicle V may be, for example, a hybrid electric vehicle including an engine and the power unit 20 as drive sources.

As illustrated in FIG. 1, the vehicle V includes, inside a vehicle body VS, front wheels 10, the power unit 20, a battery pack 30, a toeboard 40, a torque box 50, side sills 60, and the vehicle body front structure S (diagonally shadowed portions surrounded by the single chain line in FIG. 1).

The power unit 20 is a drive device configured to drive the front wheels 10 and including components, not illustrated, such as a motor, a transmission, a clutch, and a drive shaft. The power unit 20 is disposed in a space interposed between front side frames 100 and sub-frames 200, described later. The power unit 20 is placed on and secured to upper surfaces of the sub-frames 200.

The battery pack 30 has a flat box shape, for example. Inside the battery pack 30, a large number of battery cells are connected in series. The battery pack 30 is capable of outputting high voltage supplied to the power unit 20, and stores power used for vehicle travel. The battery pack 30 is disposed in a space surrounded by rigid frames, such as the torque box 50 and the side sills 60, described later. The battery pack 30 is used in a vehicle, such as an electric vehicle (EV) and a hybrid electric vehicle (HEV).

The toeboard 40 is a partition wall standing in the vertical direction in front of a cabin CA so as to separate the front wheel drive device and the cabin CA of the vehicle V from each other. The toeboard 40 is coupled to upper sides of rear portions of the front side frames 100, described later, by welding, for example.

The torque box 50 is a component interposed between the front side frames 100 and the side sills 60, described later, and configured to couple the front side frames 100 and the side sills 60 to each other. The torque box 50 is a framework extending on a bottom surface of the vehicle V in a vehicle width direction, and is coupled to one end portion of each of the front side frames 100 on the left and right sides of the torque box 50 by welding, for example. The torque box 50 is made of a material such as a metal of high rigidity, and has a substantially rectangular closed cross-sectional shape. The torque box 50 is located forward of the battery pack 30, and each end portion of the torque box 50 is coupled to one end portion of each of the side sills 60 on the left and right sides of the torque box 50 by welding, for example.

The one end portion of each of the front side frames 100 on the left and right sides of the torque box 50 is coupled to a front surface and an upper surface of the torque box 50 by welding, for example.

It is noted that an area rearward of the torque box 50 is a protection area PA configured to prevent deformation of the cabin CA located above the protection area PA and the battery pack 30 located below the protection area PA.

The side sills 60 are disposed on the bottom surface of the vehicle V on both sides in the vehicle width direction. Each of the side sills 60 is a framework extending in the fore-and-aft direction, is made of a material such as a metal of high rigidity, and has a substantially rectangular closed cross-sectional shape. The side sills 60 constitute bottom sides of the protection area PA on both sides.

The vehicle body front structure S is disposed inside a vehicle front compartment FA forward of the torque box 50. A configuration of the vehicle body front structure S will be described below.

Configuration of Vehicle Body Front Structure S

Referring to FIG. 2 to FIG. 5, the vehicle body front structure S according to the embodiment will be described.

Figure 2:
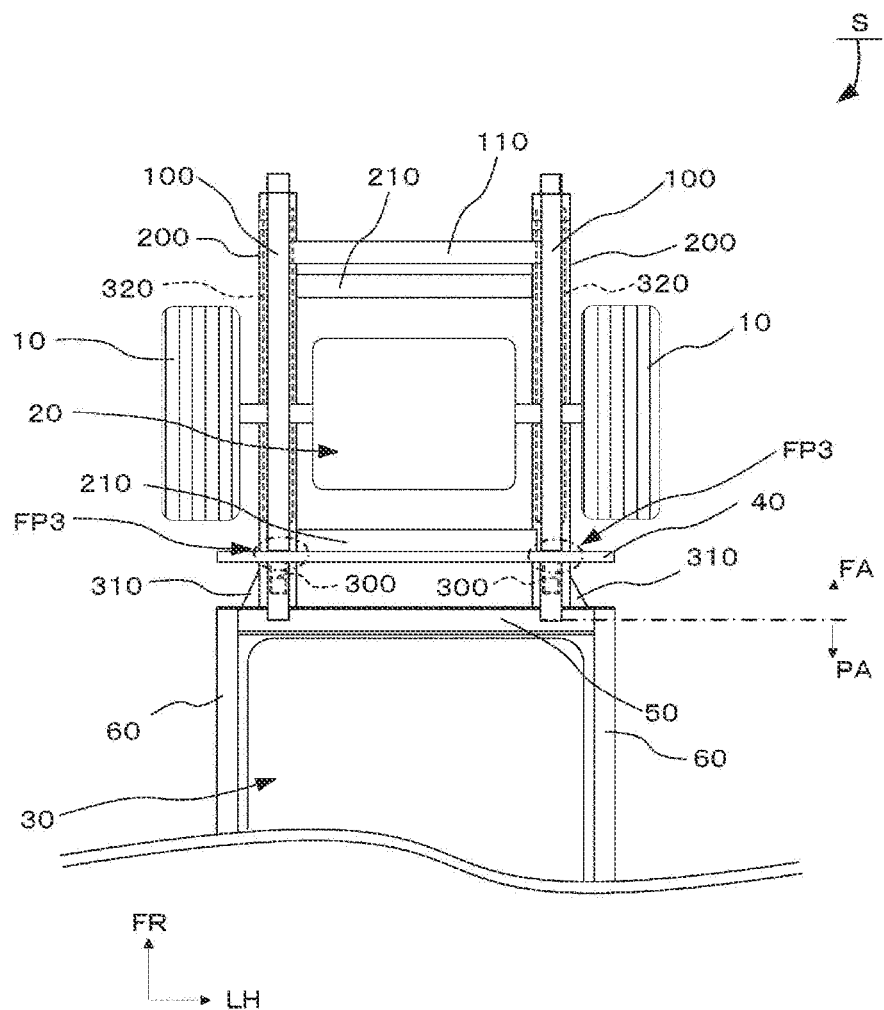
FIG. 2 is a diagram illustrating a configuration of a vehicle body front structure illustrated in FIG. 1, as viewed from above.

As illustrated in FIG. 2, the vehicle body front structure S includes the front side frames 100, a cross member 110, the sub-frames 200, sub-cross members 210, first transmission members 300, second transmission members 310, and operation levers 320. The vehicle body front structure S is in lateral symmetry in the vehicle width directions of the vehicle V.

Figure 3:
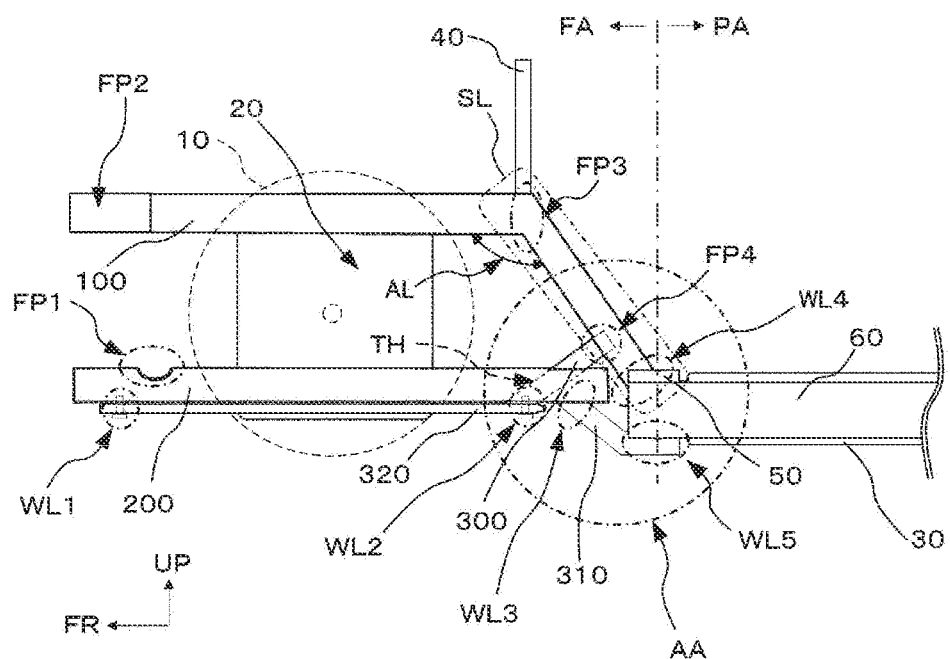
FIG. 3 is a side view of the vehicle body front structure illustrated in FIG. 1, as viewed from the right.

The front side frames 100 are provided in a pair in the vehicle width direction in a front part of the vehicle V. The front side frames 100 are located above the power unit 20 configured to drive the front wheels 10 of the vehicle V, and extend in the fore-and-aft direction of the vehicle V. As illustrated in FIG. 3, each of the front side frames 100 includes an inclined portion SL bent downward toward the rear of the vehicle V from a bent portion FP3, which is a joint with the toeboard 40. One end portion of the front side frame 100 on a rear side of the vehicle V is coupled to the torque box 50 by welding, for example. The front side frames 100 constitute a framework of the vehicle V, and are made of a material such as a metal of high rigidity. Each of the front side frames 100 has a substantially rectangular closed cross-sectional shape. Each of the front side frames 100 includes such a bent portion FP3 that an angle AL between a side connecting a fragile portion FP2, described later, with the bent portion FP3 and a side connecting the bent portion FP3 with a joint WL4 is an obtuse angle. In the front side frame 100, a substantially rectangular recess FP4 is formed in a front side of the inclined portion SL between the bent portion FP3 and the joint WL4. One end portion of the first transmission member 300 is fitted in the recess FP4 of the front side frame 100. At the recess FP4, the first transmission member 300 and the front side frame 100 are coupled to each other by welding, for example. From a structural viewpoint, the recess FP4 is lower in strength than the surroundings. Therefore, the recess FP4 serves as a fragile part disposed in the inclined portion SL of the front side frame 100.

Moreover, a fragile portion FP2 is disposed on an end portion of the front side frame 100 at a front side of the vehicle V. In one embodiment, the fragile portion FP2 may serve as a "second fragile portion". The fragile portion FP2 is made of, for example, a weaker material than the front side frame 100 rearward of the fragile portion FP2, and has a substantially rectangular closed cross-sectional shape. The fragile portion FP2 is disposed forward of the power unit 20.

The front side frames 100 are disposed at such positions that even when a small overlap collision occurs from the front, the front end portions of the front side frames 100 can sustain the collision. In one example, the center of the front end portion of each of the front side frames 100 is located at a distance 25% or less of a vehicle width of the vehicle V from a vehicle width end of the vehicle V.

As illustrated in FIG. 2, the cross member 110 extends in the vehicle width direction at front portions of the front side frames 100, and each end portion of the cross member 110 is coupled to each of the front side frames 100 on the left and right sides in the vehicle width direction by welding, for example. The cross member 110 is made of a material such as a metal, and has a substantially rectangular closed cross-sectional shape.

As illustrated in FIG. 3, the sub-frames 200 are provided in a pair on both sides in the vehicle width direction under the front side frames 100. The sub-frames 200 are located on a bottom surface of the power unit 20 and extend in the fore-and-aft direction of the vehicle V. The sub-frames 200 are disposed on both sides of the vehicle front in the vehicle width direction, and are made of a material such as a metal of high rigidity. Each of the sub-frames 200 has a substantially rectangular closed cross-sectional shape. Bottom surfaces of the sub-frames 200 are located at a higher level than the bottom surface of the torque box 50 is. The sub-frames 200 are disposed at such positions that even when a small overlap collision occurs from the front, front end portions of the sub-frames 200 can sustain the collision. In one example, the center of the front end portion of each of the sub-frames 200 is located at a distance 25% or less of the vehicle width of the vehicle V from a vehicle width end of the vehicle V.

Moreover, a fragile portion FP1 of a concave shape is disposed in an upper surface of each of the sub-frames 200 on a front side of the vehicle V and located forward of the power unit 20. In one embodiment, the fragile portion FP1 may serve as a "first fragile portion". A portion forward of the fragile portion FP1 is made more rigid than the fragile portion FP2 formed in the front side frame 100.

As illustrated in FIG. 2, the sub-cross members 210 extend in the vehicle width direction between the sub-frames 200. The sub-cross members 210 are disposed forward and rearward of the power unit 20. The sub-cross members 210 are made of a material such as a metal, and each of the sub-cross members 210 has a substantially rectangular closed cross-sectional shape. End portions of each of the sub-cross members 210 are coupled to the sub-frames 200 on the left and right sides in the vehicle width direction by welding, for example. The sub-cross members 210 and the sub-frames 200 form a number-sign structure of double crosses intersecting each other in parallel. A power unit mount, not illustrated, where the power unit 20 is mounted is disposed on the upper side of the sub-cross members 210.

Figure 4:
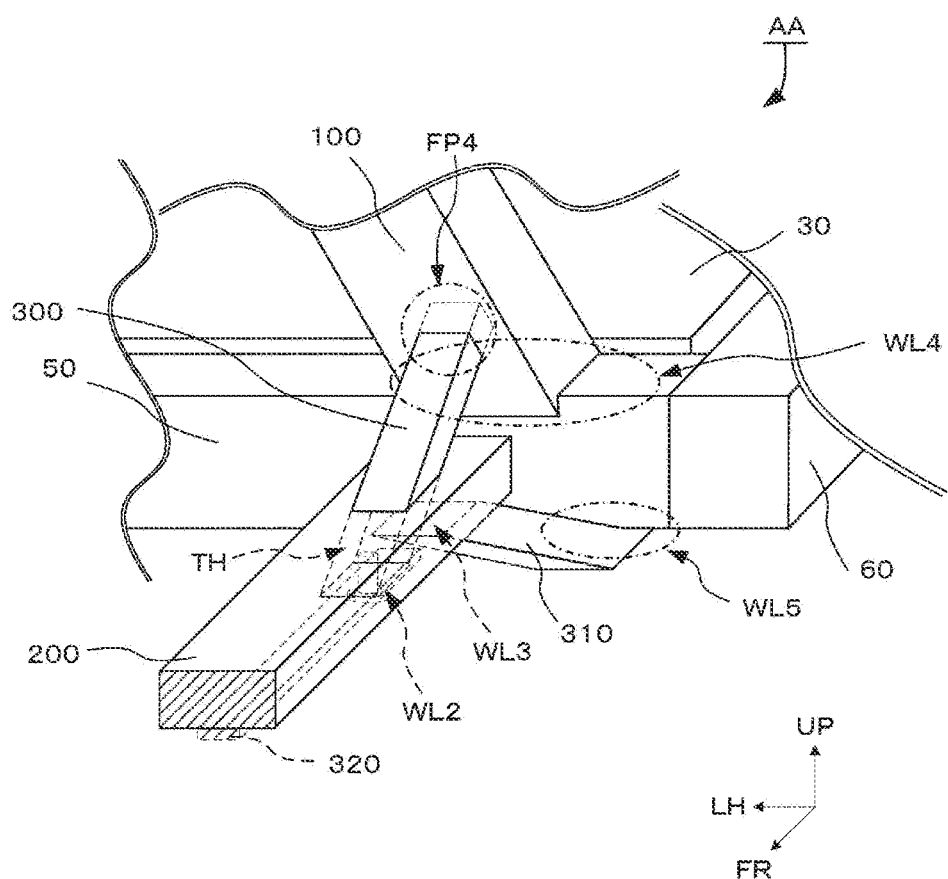
FIG. 4 is a perspective view of area AA illustrated in FIG. 3, as viewed from above.

The first transmission members 300 are made of a material such as a metal, have a substantially rectangular closed cross-sectional shape, and have end surfaces closed. Each of the first transmission members 300 couples the front side frame 100 and the sub-frame 200 to each other. In one example, as illustrated in FIG. 3 and FIG. 4, a first end of the first transmission member 300 is fitted in a substantially rectangular through hole TH in a rear portion of the sub-frame 200, and coupled to the sub-frame 200. The first end of the first transmission member 300 is secured to the operation lever 320 by a bolt, for example, on a lower surface side of the sub-frame 200. Meanwhile, a second end of the first transmission member 300 is fitted in the recess FP4 in the inclined portion SL of the front side frame 100, and coupled to the front side frame 100 at the recess FP4 by welding, for example.

Figure 5:
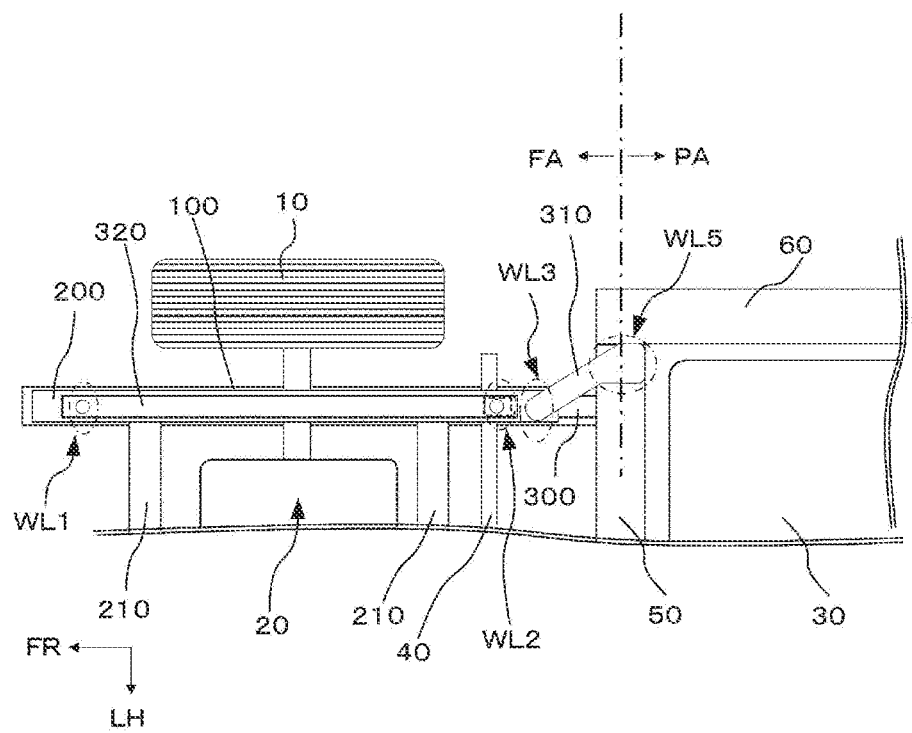
FIG. 5 is a bottom view of the vehicle body front structure illustrated in FIG. 1, as viewed from below.

The second transmission members 310 are made of a material such as a metal of high rigidity. Each of the second transmission members 310 has a substantially rectangular closed cross section or a substantially rectangular solid cross section. The second transmission member 310 has a first end coupled to the torque box 50 by welding, for example, and has a second end coupled to the sub-frame 200 by welding, for example. In one example, the first end of the second transmission member 310 is coupled to a joint WL5 on a bottom surface side of the torque box 50 firmly by welding, for example. The second end of the second transmission member 310 is coupled to a joint WL3 on a bottom surface side of the sub-frame 200 at an inner side in the vehicle width direction firmly by welding, for example. Because the second end of the second transmission member 310 is coupled to the sub-frame 200 located above the torque box 50, the second end of the second transmission member 310 is inclined upward toward the vehicle front. As illustrated in FIG. 5, the second transmission member 310 extends gradually more outward of the vehicle V from the joint WL3 toward the joint WL5. The second transmission member 310 is formed to have a width at the joint WL5 in the vehicle width direction larger than a width at the joint WL3 in the vehicle width direction.

The operation levers 320 are made of a material such as a metal of high rigidity, and extend in the fore-and-aft direction. Each of the operation levers 320 has a substantially bar shape having a substantially rectangular closed cross section or a substantially rectangular solid cross section. The operation levers 320 are disposed along lower surfaces of the sub-frames 200. Each of the operation levers 320 has a first end on a front side secured to the sub-frame 200 by a bolt, for example, and has a second end on a rear side secured to an end portion of the first transmission member 300 that extends through the sub-frame 200 by a bolt, for example. In one example, at a joint WL1 in a front portion of the sub-frame 200, the first end of the operation lever 320 on the front side is secured to the sub-frame 200 by a bolt, for example. The joint WL1 is located forward of the fragile portion FP1 of the sub-frame 200. At a joint WL2, the operation lever 320 is secured, by a bolt, for example, to the end portion of the first transmission member 300 that extends through the sub-frame 200. The joint WL2 is located forward of the joint WL3. Between the joint WL1 and the joint WL2 of the operation lever 320, the operation lever 320 and the sub-frame 200 are in close contact with each other.

Operation and Effect

The vehicle body front structure S according to the embodiment having the above-described configuration absorbs collision energy in the event of a frontal collision of the vehicle V with a collision object so as to prevent deformation of the cabin CA and the battery pack 30 disposed in the protection area PA.

In the case of a full wrap frontal collision, impact absorption structures on both sides in the vehicle width direction operate. In the case of an overlap collision and a small overlap collision, an impact absorption structure on a side where the collision occurs mainly operates. Hereinafter, referring to FIG. 6A to FIG. 6D, a description will be given on an operation when a frontal collision occurs with an impact absorption structure on the right in a front view.

Figure 6A:
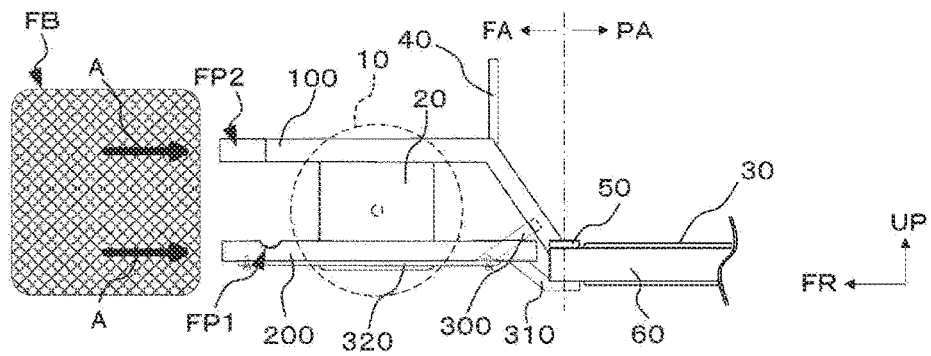
FIG. 6A to FIG. 6D illustrate deformation of the vehicle body front structure according to the embodiment of the disclosure in the event of a frontal collision.

As illustrated in FIG. 6A, when a collision object FB collides with the front of the vehicle V, collision energy is generated from a direction indicated by arrows A.

Figure 6B:
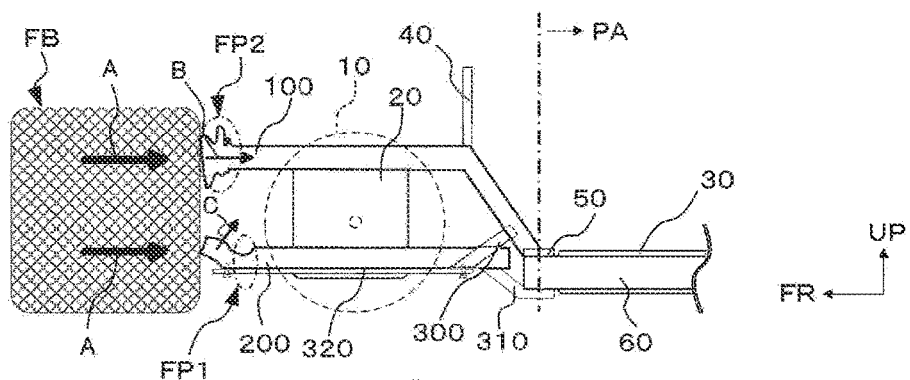

As illustrated in FIG. 6B, when the collision object FB collides with the front of the vehicle V, the collision energy is transmitted to the fragile portion FP1 disposed in a front part of the sub-frame 200 and to the fragile portion FP2 disposed in a front part of the front side frame 100 from the direction indicated by arrows A. Because the fragile portion FP1 is disposed under and at the rear of the fragile portion FP2, the fragile portion FP2 first starts collapsing, and the collision energy is transmitted to the fragile portion FP1 immediately afterward. The fragile portion FP1 is formed in the upper surface of the sub-frame 200. Consequently, as indicated by arrow C, a portion of the sub-frame 200 that is located forward of the fragile portion FP1 is deformed by bending upward about the fragile portion FP1 as a pinned support while collapsing in an axial direction of the sub-frame 200. The fragile portion FP2 is configured more likely to deform than the portion of the front side frame 100 that is rearward of the fragile portion FP2. Therefore, as indicated by arrow B, the fragile portion FP2 deforms by collapsing rearward of the vehicle V. Thus, the fragile portion FP1 bends, and the fragile portion FP2 collapses, so that the collision energy is absorbed by deformation of the fragile portion FP1 and the fragile portion FP2.

Figure 6C:
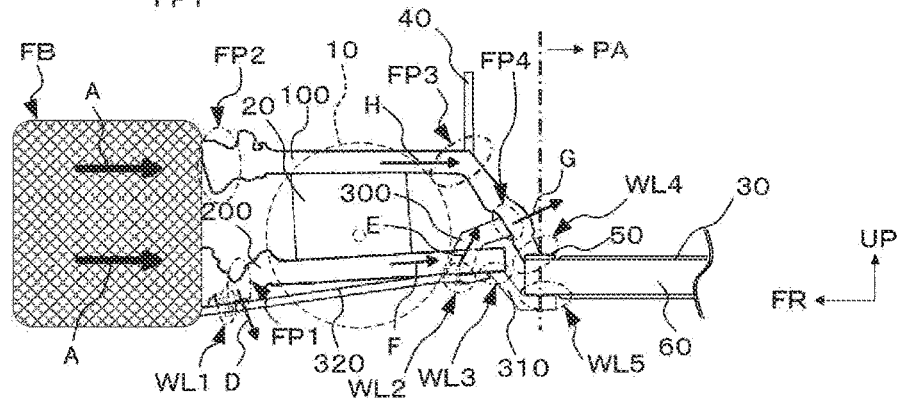

Furthermore, when the collision energy is larger, as illustrated in FIG. 6C, the front portion of the sub-frame 200 is pressed in a direction indicated by arrow D, and consequently, the front portion of the operation lever 320 is pressed in the direction indicated by arrow D. Then, the front portion of the operation lever 320 along with the sub-frame 200 is deformed downward about the joint WL3 as a pinned support. Therefore, the collision energy transmitted to the sub-frame 200 and advancing rearward as indicated by arrow F is partly converted into kinetic energy downward as indicated by arrow D, so that the collision energy is consumed as the kinetic energy.

Because a rear end portion of the sub-frame 200 is secured at the joint WL3 by the second transmission member 310, a rear end portion of the operation lever 320 presses the first transmission member 300 upward in a direction indicated by arrow E via the joint WL2. Therefore, the collision energy transmitted to the sub-frame 200 and advancing rearward as indicated by arrow F is partly converted into kinetic energy that presses the first transmission member 300 upward as indicated by arrow E, so that the collision energy is consumed as the kinetic energy, and that the collision energy is dispersed to the first transmission member 300.

Moreover, because the collision energy indicated by arrow F is transmitted to the sub-frame 200, the collision energy in the direction indicated by arrow F along with the collision energy in the direction indicated by arrow E is transmitted to the first transmission member 300. Then, the first transmission member 300 is bent in such a manner that a side where the second transmission member 310 is disposed becomes a valley side. Consequently, the collision energy is absorbed by deformation of the first transmission member 300.

The collision energy transmitted to the first transmission member 300 is transmitted to the recess FP4, which is a joint between the first transmission member 300 and the front side frame 100. The first transmission member 300 presses the recess FP4 of the front side frame 100 in a direction indicated by arrow G. The recess FP4 is a fragile part of the inclined portion SL of the front side frame 100. The front side frame 100 is bent at the recess FP4 in the direction indicated by arrow G, so that the collision energy is dispersed to the front side frame 100 and also absorbed by deformation of the front side frame 100.

Due to the collision energy indicated by arrow H, the bent portion FP3 of the front side frame 100 becomes a fragile portion, and the front side frame 100 is bent about the joint WL4 as a pinned support while the bent portion FP3 is deformed upward. Because the front side frame 100 is bent, the collision energy is absorbed by deformation of the front side frame 100.

Figure 6D:
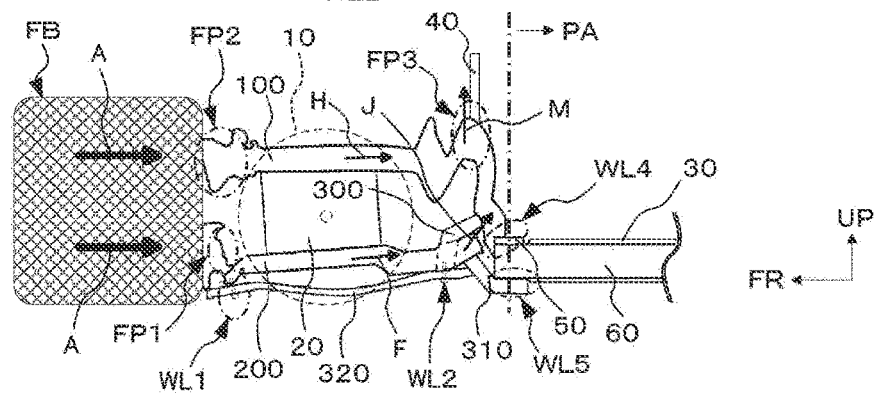

Furthermore, when the collision energy is larger, as illustrated in FIG. 6D, collapse of the sub-frame 200 between the joint WL1 and the joint WL2 proceeds due to the collision energy transmitted to the sub-frame 200 as indicated by arrow F. Then, because the second transmission member 310 is inclined upward toward the vehicle front, the collision energy indicated by arrow F is transmitted upward toward the rear as indicated by arrow J to bend the second transmission member 310 about the joint WL5 as a pinned support. Consequently, the rear end portion of the sub-frame 200 is pressed upward toward the vehicle rear about the joint WL5 as a pinned support. That is, the second transmission member 310 causes the sub-frame 200 to deform in a direction not to interfere with the torque box 50.

Due to the collision energy in the front side frame 100 as indicated by arrow H, collapse of the front side frame 100 between the fragile portion FP2 and the bent portion FP3 proceeds. At the bent portion FP3, the collision energy is transmitted in a direction indicated by arrow M, so that the front side frame 100 is bent in a direction to press the toeboard 40 upward. Furthermore, the inclined portion SL of the front side frame 100 is deformed upward toward the rear about the joint WL4 as a pinned support. Thus, the collision energy indicated by arrow H is absorbed by deformation of the front side frame 100.

When the input of the collision energy is ended, and when transmission of the collision energy to the front side frame 100 and the sub-frame 200 is ended, absorption of the collision energy by deformation of the vehicle body front structure S is ended in consequence.

As described above, the vehicle body front structure S according to the embodiment includes: the pair of front side frames 100 disposed in the front part of the vehicle V and extending in the fore-and-aft direction of the vehicle V; the pair of sub-frames 200 disposed below the front side frames 100 and located on the bottom surface of the power unit 20 configured to drive the front wheels 10 of the vehicle V, the sub-frames 200 extending in the fore-and-aft direction of the vehicle V; the torque box 50 extending on the bottom surface of the vehicle V in the vehicle width direction and coupled to the front side frames 100; the toeboard 40 coupled to the upper portions of the front side frames 100; the first transmission member 300 configured to couple each of the front side frames 100 and each of the sub-frames 200 to each other; the second transmission member 310 configured to couple each of the sub-frames 200 and the torque box 50 to each other; and the operation lever 320 disposed along the lower surface of each of the sub-frames 200, the operation lever 320 having the first end on the front side secured to the sub-frame 200 and having the second end on the rear side secured to the first transmission member 300. The front side frame 100 includes the inclined portion SL bent downward toward the rear of the vehicle V from the bent portion FP3, which is the joint with the toeboard 40. The first transmission member 300 extends from the joint WL2 with the sub-frame 200 and is coupled to the inclined portion SL of the front side frame 100. The second transmission member 310 has the first end coupled to the bottom surface of the torque box 50 and has the second end coupled to the lower surface of the sub-frame 200 that is located at a higher level than the bottom surface of the torque box 50 is.

The vehicle body front structure S causes the front side frame 100 and the sub-frame 200 to sustain collision energy generated by a frontal collision of the vehicle V. The collision energy transmitted to the sub-frame 200 is transmitted to the first transmission member 300, the second transmission member 310, and the operation lever 320, which are coupled to the sub-frame 200. The collision energy transmitted to the first transmission member 300 is transmitted to the front side frame 100, and the collision energy transmitted to the second transmission member 310 is transmitted to the torque box 50 and the side sill 60. The collision energy transmitted to the operation lever 320 is transmitted to the front side frame 100 via the first transmission member 300 by deformation of the operation lever 320. The collision energy transmitted to the front side frame 100 is transmitted to the fragile portion FP2 and the bent portion FP3 of the front side frame 100 and to the torque box 50.

That is, the first transmission member 300, the second transmission member 310, and the operation lever 320 disperse the collision energy, which has been transmitted to the front side frame 100 and the sub-frame 200, to the front side frame 100, the sub-frame 200, the torque box 50, the side sill 60, the fragile portion FP1, the fragile portion FP2, the bent portion FP3, and the recess FP4, for example, that constitute the vehicle body front structure S, so that the collision energy can be absorbed inside the vehicle front compartment FA.

This can prevent deformation of the cabin CA and the battery pack 30 existing in the protection area PA.

In the vehicle body front structure S according to the embodiment, the fragile portion FP1 is disposed in the sub-frame 200, and the first end of the operation lever 320 is secured to the sub-frame 200 at a position forward of the fragile portion FP1 whereas the second end of the operation lever 320 is secured to the first transmission member 300 at a position rearward of the power unit 20.

When a frontal collision of the vehicle V occurs, the portion of the sub-frame 200 that is forward of the fragile portion FP1 is bent upward about the fragile portion FP1 as a pinned support while the fragile portion FP1 is made to collapse in the axial direction. When the collision energy is further applied, the fragile portion FP1 collapses in the axial direction to press the front portion of the sub-frame 200 downward, and collapse of the sub-frame 200 proceeds while the front portion of the sub-frame 200 is deformed downward about the joint WL3 as a pinned support. Then, because the operation lever 320 is curved downward about the joint WL1 and the joint WL2 as pinned supports, the operation lever 320 absorbs the collision energy. The operation lever 320 presses the first transmission member 300 secured at the joint WL2 upward so as to disperse the collision energy to the first transmission member 300.

That is, when the frontal collision of the vehicle V occurs, the vehicle body front structure S causes the fragile portion FP1 of the sub-frame 200 to bend, and causes the operation lever 320 to curve so as to absorb the collision energy. Then, in the vehicle body front structure S, the collision energy is dispersed from the operation lever 320 to the first transmission member 300, so that the collision energy can be absorbed inside the vehicle front compartment FA.

This can prevent deformation of the cabin CA and the battery pack 30 existing in the protection area PA.

In the vehicle body front structure S according to the embodiment, the recess FP4 is disposed in the inclined portion SL of the front side frame 100, and the end portion of the first transmission member 300 is fitted in and coupled to the recess FP4.

The first end of the first transmission member 300 is fitted in the through hole TH in the sub-frame 200 and secured to the operation lever 320 by a bolt, for example. The second end of the first transmission member 300 is fitted in the recess FP4 in the front surface of the inclined portion SL of the front side frame 100, and the first transmission member 300 and the front side frame 100 are coupled to each other.

When a frontal collision of the vehicle V occurs, the first transmission member 300 transmits the collision energy, which has been transmitted from the sub-frame 200 and the operation lever 320, to the front side frame 100 via the recess FP4.

That is, the first transmission member 300 converts a direction of the collision energy transmitted to the sub-frame 200 and advancing toward the torque box 50 into a rearward and upward direction, and disperses the collision energy to the first transmission member 300 and the front side frame 100, so that the collision energy can be absorbed inside the vehicle front compartment FA.

This can prevent deformation of the cabin CA and the battery pack 30 existing in the protection area PA.

In the vehicle body front structure S according to the embodiment, the fragile portion FP2 is disposed in the end portion of the front side frame 100 at a vehicle front side. When a frontal collision of the vehicle V occurs, the fragile portion FP2 collapses in the axial direction of the front side frame 100. At this time, with the sub-frame 200 being disposed under the front side frame 100, as collapse of the fragile portion FP2 proceeds, collapse of the fragile portion FP1 of the front side frame 100 proceeds. Then, while the front portion of the sub-frame 200 collapses in the axial direction, the sub-frame 200 is deformed and bent upward about the fragile portion FP1 as a pinned support.

That is, the fragile portion FP2 collapses to absorb the collision energy, and the fragile portion FP2 collapses to substantially the same extent as the fragile portion FP1 disposed under the fragile portion FP2, so that the collision energy can be dispersed to the front side frame 100 and the sub-frame 200.

This can prevent deformation of the cabin CA and the battery pack 30 existing in the protection area PA.

It is noted that in the embodiment, the second transmission member 310 extends gradually more outward of the vehicle V from the joint WL2 toward the joint WL5, and that the width in the vehicle width direction at the joint WL5 is larger than the width in the vehicle width direction at the joint WL2. However, the second transmission member 310 may be formed in a substantially rectangular shape in a plan view. In the embodiment, the second transmission member 310 is coupled to the torque box 50 at the joint WL5. However, the second transmission member 310 may be coupled to the side sill 60 at the joint WL5.

The operation lever 320 may include a fragile portion between the joint WL1 and the joint WL2. The first transmission member 300 may include a fragile portion between the joint WL2 and the recess FP4.

Although the embodiment of the disclosure has been described in detail heretofore with reference to the drawings, configuration examples are not to be limited to the embodiment but may include designs, for example, within the scope of the subject matter of the disclosure.

According to the one or more embodiments of the disclosure, deformation of the cabin and the battery pack can be prevented even in the multiple frontal collision modes.

The invention claimed is:

1. A vehicle body front structure for a vehicle, the vehicle body front structure comprising:
   front side frames in a pair, the front side frames being disposed in a front part of the vehicle and extending in a fore-and-aft direction of the vehicle;
   sub-frames in a pair, each of the sub-frames being disposed under a corresponding one of the front side frames and located on a bottom surface of a power unit of the vehicle, the power unit being configured to drive front wheels of the vehicle, the sub-frames extending in the fore-and-aft direction of the vehicle;
   a torque box extending on a bottom surface of the vehicle in a vehicle width direction of the vehicle and coupled to the front side frames;
   a toeboard coupled to upper portions of the front side frames;
   first transmission members, each of the first transmission members being configured to couple a corresponding one of the front side frames and a corresponding one of the sub-frames;
   second transmission members, each of the second transmission members being configured to couple the torque box and a corresponding one of the sub-frames; and
   operation levers, each of the operation levers being disposed along a lower surface of a corresponding one of the sub-frames, each of the operation levers having one end on a front side secured to the corresponding one of the sub-frames and having another end on a rear side secured to a corresponding one of the first transmission members,
   wherein each of the front side frames comprises an inclined portion bent downward toward a rear of the vehicle from a joint with the toeboard,
   wherein each of the first transmission members extends from a joint with the corresponding one of the sub-frames and is coupled to the inclined portion of the corresponding one of the front side frames, and
   wherein each of the second transmission members has one end coupled to a bottom surface of the torque box and has another end coupled to the lower surface of the corresponding one of the sub-frames, the lower surface being higher than the bottom surface of the torque box in a vertical direction of the vehicle.

2. The vehicle body front structure according to claim 1, wherein a first fragile portion is disposed in each of the sub-frames, and the one end of the corresponding one of the operation levers is secured to each of the sub-frames at a position forward of the first fragile portion whereas said another end of the operation levers is secured to the corresponding one of the first transmission members at a position rearward of the power unit.

3. The vehicle body front structure according to claim 2, wherein a recess is disposed in the inclined portion of each of the front side frames, and an end portion of each of the first transmission members is fitted in and coupled to the recess.

4. The vehicle body front structure according to claim 3, wherein a second fragile portion is disposed in an end portion of each of the front side frames at a front of the vehicle.

* * * * *